US010287904B2

(12) United States Patent
Filipenco et al.

(10) Patent No.: US 10,287,904 B2
(45) Date of Patent: May 14, 2019

(54) MULTI-ELEMENT INNER SHROUD EXTENSION FOR A TURBO-MACHINE

(71) Applicant: United Technologies Corporation, Farmington, CT (US)

(72) Inventors: Victor G. Filipenco, Portland, CT (US); Anthony R. Bifulco, Ellington, CT (US)

(73) Assignee: United Technologies Corporation, Farmington, CT (US)

( * ) Notice: Subject to any disclaimer, the term of this patent is extended or adjusted under 35 U.S.C. 154(b) by 448 days.

(21) Appl. No.: 15/035,258

(22) PCT Filed: Nov. 4, 2014

(86) PCT No.: PCT/US2014/063793
§ 371 (c)(1),
(2) Date: May 9, 2016

(87) PCT Pub. No.: WO2015/077011
PCT Pub. Date: May 28, 2015

(65) Prior Publication Data
US 2016/0273373 A1    Sep. 22, 2016

Related U.S. Application Data

(60) Provisional application No. 61/905,936, filed on Nov. 19, 2013.

(51) Int. Cl.
*F01D 25/24*    (2006.01)
*F01D 11/00*    (2006.01)
*F01D 9/04*    (2006.01)
*F02C 7/04*    (2006.01)
*F01D 5/02*    (2006.01)
(Continued)

(52) U.S. Cl.
CPC .............. *F01D 11/001* (2013.01); *F01D 5/02* (2013.01); *F01D 9/02* (2013.01); *F01D 9/04* (2013.01);
(Continued)

(58) Field of Classification Search
CPC .... F01D 11/001; F01D 25/243; F01D 25/246; F01D 5/02; F01D 9/02; F01D 25/24;
(Continued)

(56) References Cited

U.S. PATENT DOCUMENTS 3,351,319 A * 11/1967 Frost ...................... F01D 5/022
415/208.2
4,055,042 A    10/1977 Colley
(Continued)

FOREIGN PATENT DOCUMENTS

EP    1808581 A2    7/2007

OTHER PUBLICATIONS

International Search Report and Written Opinion for International Application No. PCT/US2014/063793 dated Apr. 22, 2015.
(Continued)

*Primary Examiner* — Eldon T Brockman
(74) *Attorney, Agent, or Firm* — Carlson, Gaskey & Olds, P.C.

(57) ABSTRACT

A turbine engine is disclosed and includes an airflow passage including an inner surface defined by a main shroud and a shroud extension. A flow splitter is disposed radially outward of the inner surface and axially overlapping the shroud extension. The turbine engine further includes a rotor including a blade proximate the shroud extension and an annular gap defined between the shroud extension and the blade of a first axial length less than a second axial length between the blade and an end of the flow splitter.

17 Claims, 8 Drawing Sheets

(51) Int. Cl.
  *F01D 9/02* (2006.01)
  *F02C 3/04* (2006.01)
(52) U.S. Cl.
  CPC ........... *F01D 25/24* (2013.01); *F01D 25/243* (2013.01); *F01D 25/246* (2013.01); *F02C 3/04* (2013.01); *F02C 7/04* (2013.01); *F05D 2220/32* (2013.01); *F05D 2230/60* (2013.01); *F05D 2230/64* (2013.01); *F05D 2230/642* (2013.01); *F05D 2240/11* (2013.01); *F05D 2260/30* (2013.01)
(58) Field of Classification Search
  CPC ...... F01D 9/04; F02C 3/04; F02C 7/04; F05D 2260/30; F05D 2230/60; F05D 2230/64; F05D 2220/32; F05D 2240/11; F05D 2230/642
  See application file for complete search history.

(56) References Cited

U.S. PATENT DOCUMENTS

| | | | |
|---|---|---|---|
| 4,655,682 A | 4/1987 | Kunz et al. | |
| 5,201,801 A | 4/1993 | Smith, Jr. | |
| 5,988,980 A | 11/1999 | Busbey et al. | |
| 6,413,043 B1 | 7/2002 | Bouyer | |
| 6,790,000 B2 | 9/2004 | Wolf | |
| 7,287,957 B2 | 10/2007 | Jahns et al. | |
| 7,435,050 B2* | 10/2008 | Welch | F01D 25/243 415/201 |
| 7,510,369 B2 | 3/2009 | Lytle | |
| 8,328,512 B2 | 12/2012 | Major et al. | |
| 2005/0175446 A1 | 8/2005 | Garner | |
| 2007/0160471 A1* | 7/2007 | Welch | F01D 25/243 415/214.1 |
| 2012/0189438 A1 | 7/2012 | Feigleson et al. | |
| 2012/0257963 A1 | 10/2012 | Major et al. | |
| 2013/0156550 A1 | 6/2013 | Franks et al. | |

OTHER PUBLICATIONS

European Search Report for EP Application No. 14864723.3 dated May 24, 2017.
International Preliminary Report on Patentability for International Application No. PCT/US2014/063793 dated Jun. 2, 2016.

* cited by examiner

MULTI-ELEMENT INNER SHROUD EXTENSION FOR A TURBO-MACHINE

REFERENCE TO RELATED APPLICATION

This application claims priority to U.S. Provisional Application No. 61/905,936 filed on Nov. 19, 2013.

STATEMENT REGARDING FEDERALLY SPONSORED RESEARCH OR DEVELOPMENT

This subject of this disclosure was made with government support under Contract No.: FA8650-09-D-2923-DO0018 awarded by the United States Air Force. The government therefore may have certain rights in the disclosed subject matter.

BACKGROUND

A gas turbine engine typically includes a fan section, a compressor section, a combustor section, and a turbine section. Air entering the compressor section is compressed and delivered into the combustor section where fuel is injected into the air flow. The combustion of the fuel with the air passing though the combustion section generates a high temperature gas flow which upon expansion through the turbines produces the shaft power required to drive the compressor and the fan section. The compressor section typically includes low and high pressure compressors, and the turbine section includes low and high pressure turbines.

An airflow path between rotating blades and fixed vanes is defined by inner and outer shroud structures. The shroud structures are attached to corresponding housings to define a gas flow path. Axial gaps between the fixed shroud structures and rotating components are required to accommodate axial shifting and expansion during operation. However, the size of the gaps is minimized to reduce airflow losses that reduce engine efficiencies. Radial Assembly of the inner diameter shrouds includes moving the shroud portions from a radially outer position past rotating and other fixed components into the desired assembled position. Size and component locations can prevent axial movement of a shroud during assembly, thereby limiting assembly to only radial movement. In such cases Radially outer structures of rotating or fixed components can interfere with the radial assembly of the case containing the inner shroud structures if the inner shroud structures are sized axially to minimize the axial gap between the inner shroud and the adjacent components when they are in the assembled position. One solution to this problem is to reduce the axial extent of the inner shroud structure so that it would clear the radially outer structures during radial assembly but this would be unacceptable if the resulting axial gap between the inner shroud structure and adjacent component(s) (typically a rotor) becomes larger than that required for efficient interference-free operation of the machine.

Turbine engine manufacturers continue to seek further improvements to engine performance including improvements to assembly, heat transfer, and thermal and propulsive efficiencies.

SUMMARY

A method of assembling a shroud assembly for a turbine engine according to an exemplary embodiment of this disclosure, among other possible options includes assembling a shroud extension from at least a first section and a second section about an engine axis, assembling a first portion of a main shroud into a first housing, assembling the first portion of the main shroud to the shroud extension, the shroud extension extends from the first portion of the main shroud and first housing, assembling a second portion of the main shroud into a second housing, and radially moving the second portion of the main shroud and second housing into engagement with the first housing and the second housing and engaging the shroud extension with the second portion of the main shroud.

In a further embodiment of any of the foregoing methods, the shroud extension is annular and includes an annular groove for receiving an annular tab defined on both the first main shroud and the second main shroud, and engaging the shroud extension with the second portion of the main shroud includes inserting a portion of the annular tab into the annular groove.

In a further embodiment of any of the foregoing methods, assembles the first portion of the main shroud to the shroud extension includes receiving a portion of the annular tab on the first main shroud within a portion of the annular groove of the shroud extension.

In a further embodiment of any of the foregoing methods, the annular tab extends radially inward and engages the annular groove disposed on a radially outer surface of the shroud extension.

In a further embodiment of any of the foregoing methods, the shroud extension includes a first axial portion including the annular groove and a second axial portion including an axially extending lip that is substantially aligned axially with the radially outer structure in the final assembly position.

In a further embodiment of any of the foregoing methods, the radially outer structure includes a splitter for dividing airflow between a bypass passage and a core flow passage.

In a further embodiment of any of the foregoing methods, includes assembling the shroud extension from a first shroud extension part and a second shroud extension part. Each of the first and second shroud extension parts form a portion of an annular ring.

In a further embodiment of any of the foregoing methods, includes aligning the first shroud extension part with the second shroud extension part with an alignment pin received within each of the first shroud extension and the second shroud extension.

A turbine engine according to an exemplary embodiment of this disclosure, among other possible things includes an airflow passage including an inner surface defined by a main shroud and a shroud extension, a flow splitter radially outward of the inner surface and axially overlapping the shroud extension, a rotor including a blade proximate the shroud extension, and an annular gap defined between the shroud extension and the blade of a first axial length less than a second axial length between the blade and an end of the flow splitter.

In a further embodiment of any of the foregoing turbine engines, the shroud extension includes a groove and the main shroud includes a tab receivable within the groove.

In a further embodiment of any of the foregoing turbine engines, the groove is on a radially outer surface of the shroud extension and the tab is on a radially inner surface of the main shroud.

In a further embodiment of any of the foregoing turbine engines, the groove in the shroud extension is a full annular groove about a radially outer surface of the shroud extension and the tab is a full annular tab that extends radially inward from the main shroud.

In a further embodiment of any of the foregoing turbine engines, the shroud extension includes a first axial portion including the groove and a second axial portion including an axially extending lip for defining the annular gap. The second axial portion is aligned with the flow splitter.

In a further embodiment of any of the foregoing turbine engines, the main shroud includes a first main shroud and a second main shroud attached to the first main shroud.

In a further embodiment of any of the foregoing turbine engines, the first main shroud and the second main shroud include annular segments.

In a further embodiment of any of the foregoing turbine engines, the shroud extension includes an annular ring formed from a first part joined to a second part.

In a further embodiment of any of the foregoing turbine engines, includes at least one alignment pin disposed between the first part and the second part for maintaining a desired alignment.

In a further embodiment of any of the foregoing turbine engines, includes an attachment plate for securing the first part to the second part.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
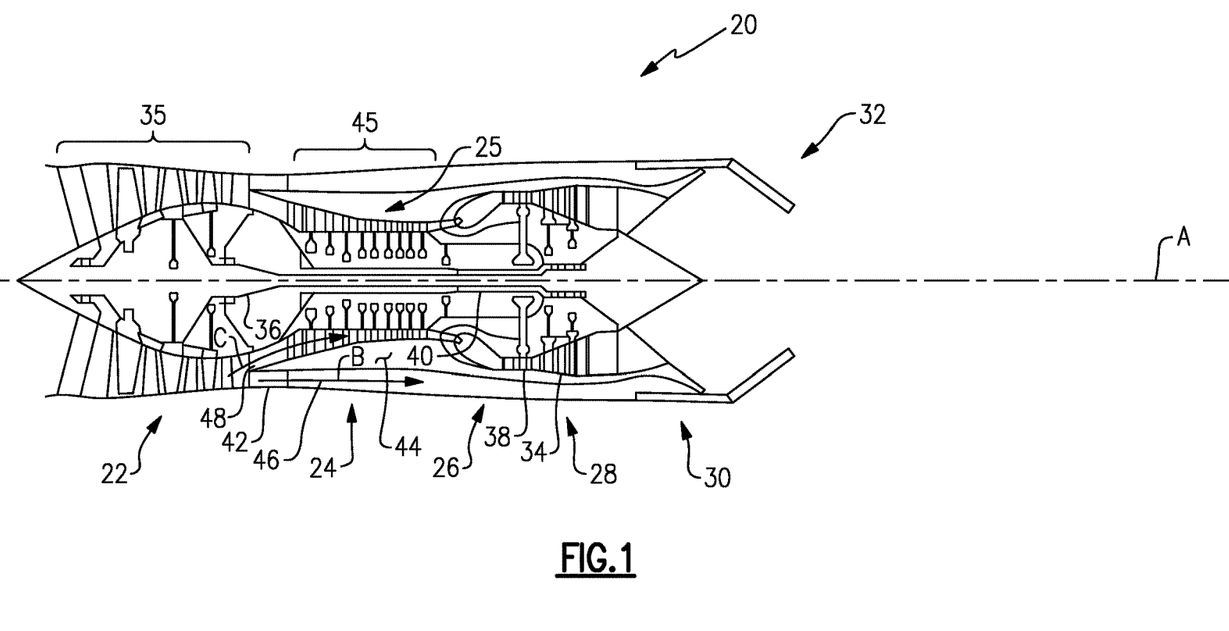
FIG. 1 is a schematic view of an example gas turbine engine.

FIG. 1 schematically illustrates a gas turbine engine 20 that includes a fan section 22, a compressor section 24, a combustor section 26 and a turbine section 28. In this example, the engine 20 also includes an augmentor section 30 and a nozzle section 32.

In this example, a core section 25 of the gas turbine engine 20 includes a high pressure turbine 38 that drives the high shaft 40 which drives the high pressure compressor 45. A low pressure turbine 34 drives a low shaft 36 which in turn, drives fan 35.

The example engine 20 includes a core flow path 48 through which core airflow C is communicated through the compressor section 24. Core airflow C is compressed as it passes through the compressor section 24, and communicated to combustor 26 where fuel in injected into the air stream. The combustion of the fuel in the air stream produces a high temperature high pressure gas which upon expansion through the high pressure turbine section 38 produces the shaft power required to drive high pressure compressor 24. Upon giving up part of its thermal energy in high pressure turbine 38, the hot gas exiting high pressure turbine 38 is communicated to low pressure turbine 34 through which it expands further, thus generating the shaft power required to drive fan 35. The example engine 20 also includes a bypass flow passage 46 through which bypass airflow B is communicated around the core section 25 to increase overall efficiency of the gas turbine engine 20 and reduce its mass relative to a pure turbojet engine of equivalent total through airflow and thrust. In example engine 20, the bypass airflow B mixes with the gas flow exiting low pressure turbine 34 and is then expanded though nozzle 32. The difference in velocity between the air entering the engine at the inlet to the fan and that exiting the nozzle represents a momentum imbalance and is seen as a thrust force on the engine. Additional fuel may be injected into and combusted in the gas stream in augmentor 30, increasing the temperature or the gas which in turn leads to a higher final velocity of the gas upon expansion through nozzle 32 and thus a higher thrust compared to when the augmentor is not used. The rotating components are housed within a case structure that includes an outer case 42 and an inner case 44. The outer case 42 and the inner case 44 define the structures in the core flow path 48 required to communicate air and high energy exhaust gases through the example gas turbine engine 20.

Figure 2:
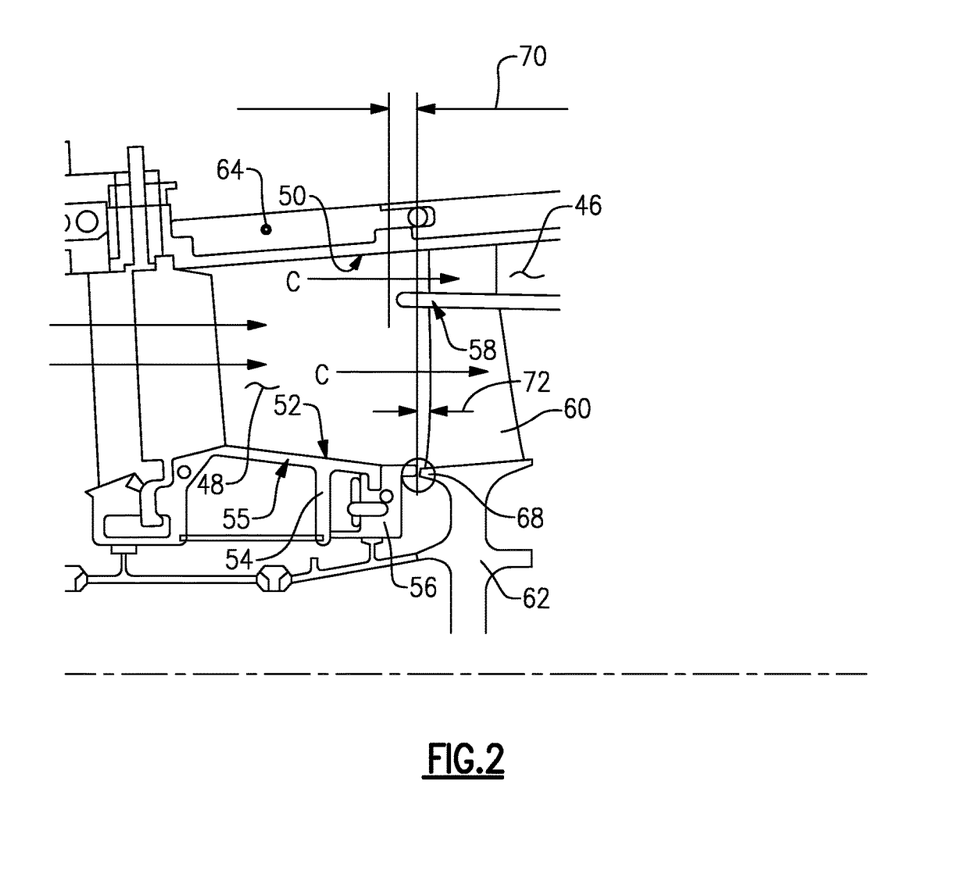
FIG. 2 is a cross-sectional view of a portion of the example gas turbine engine.

Referring to FIG. 2, an example inlet 55 axially forward of the compressor section 24 is illustrated and includes a rotor 62 that supports a blade 60. The rotor 62 rotates about the axis A and drives core airflow C through the core engine section 25. A flow splitter 58 is provided within the inlet 55 and divides core airflow C from bypass airflow B communicated through the bypass passage 46. A gap 68 is provided between the blades 60 and the rotating rotor 62 and an inner surface 52. The gap 68 is provided to accommodate axial movement that may occur during operation. The gap 68 is of desired size such that excessive airflow is not lost through the gap 68. As appreciated, excessive loss or airflow communication outside of the core airflow path reduces engine efficiencies and is undesired.

The inlet portion of the core airflow path 48 includes an inner surface 52 and an outer surface 50. The inner surface 52 is defined in the inlet 55 by a shroud assembly 15 including a main shroud 54 and shroud extension 56.

The shroud extension 56 extends axially aft of the main shroud 54 and is overlapped axially by a portion of the flow splitter 58. The flow splitter 58 is a fixed structure and is disposed radially outward from the inner surface 52. The example shroud extension 56 defines the gap 68 between the blade 60 and the fixed structure of the inner surface 52. The shroud extension 56 is disposed within a first axial length 70 that is defined between a forward portion of the rotating blade 60 and the distal end of the flow splitter 58. A second axial length 72 is disposed between the aft most portion of the shroud extension 56 and a forward portion of the blade 60.

Assembly of the gas turbine engine requires positioning and moving the main shroud 54 radially inward. However, that radially inward movement cannot be accomplished when an axially extending and radially outward feature, such as the example flow splitter, is present. Accordingly, the fixed structure of the flow splitter 58 creates assembly challenges. The disclosed engine assembly includes features for maintaining the desired gap 68 while allowing radial installation of the main shroud 54.

Figure 3:
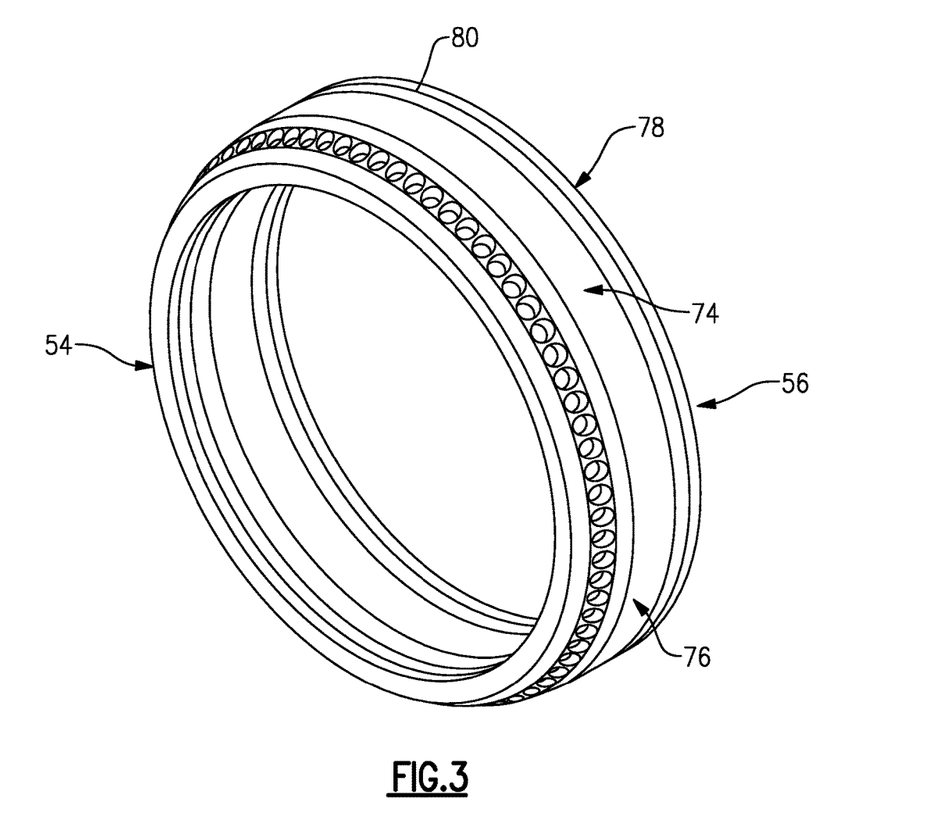
FIG. 3 is a perspective view of a main shroud and shroud extension assembly.
Figure 4:
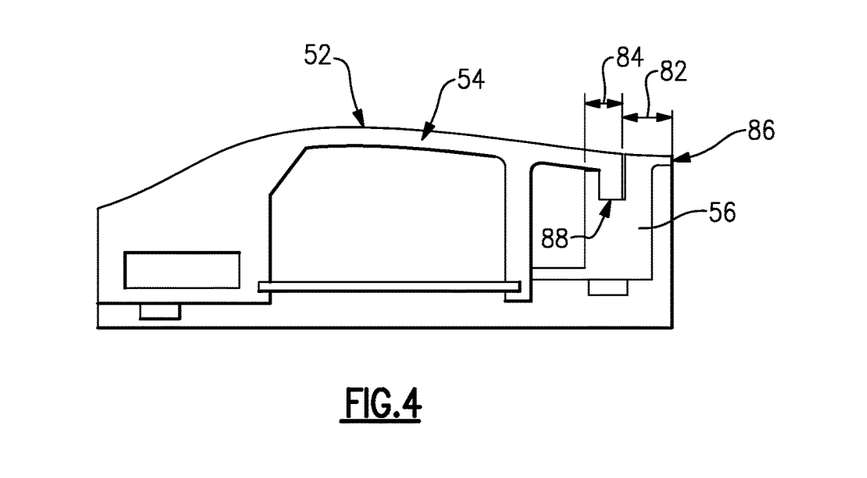
FIG. 4 is a cross-sectional view of the main shroud and shroud extension assembly.

Referring to FIGS. 3 and 4, the example main shroud 54 and shroud extension 56 are shown in a perspective view and are attached by way of an annular groove 88 defined within the shroud extension 56. The main shroud includes an annular tab 98 that fits within the annular groove 88 of the shroud extension 56. The shroud extension 56 also includes a forward axial portion 82 that includes a lip 86. The lip 86 corresponds with the position of the rotating blade 60 to define the desired gap 68. A second axial portion 84 includes the annular groove within which the tab 98 is received.

Figure 5:
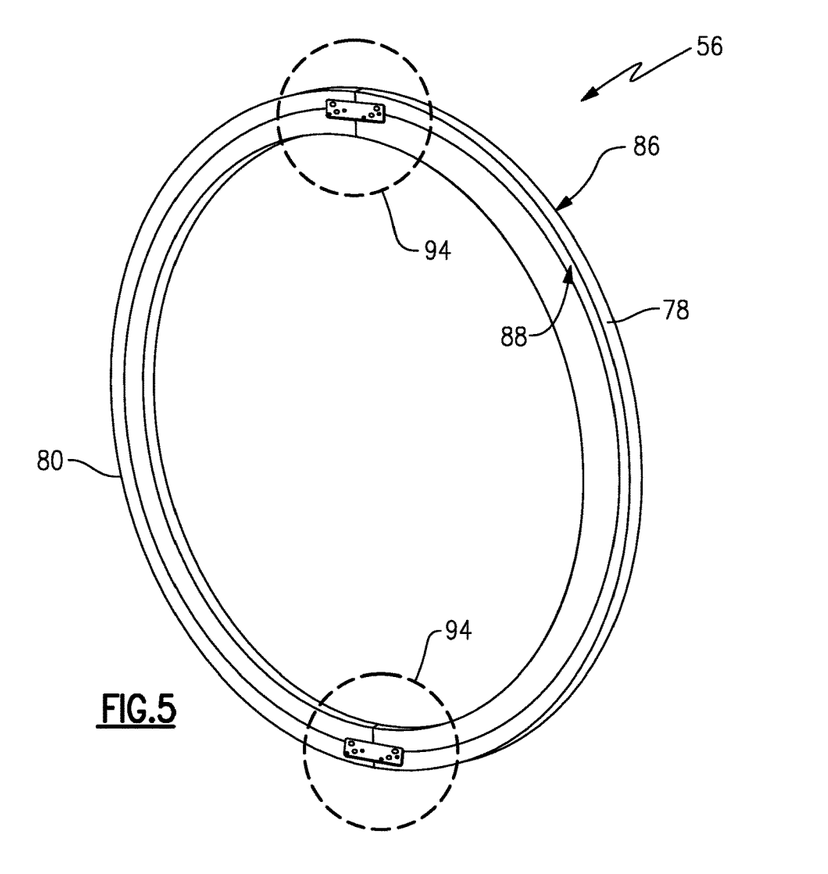
FIG. 5 is a perspective view of the example shroud extension.
Figure 6:
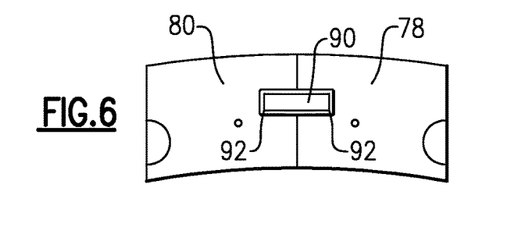
FIG. 6 is a cross-section of an attachment point.
Figure 7:
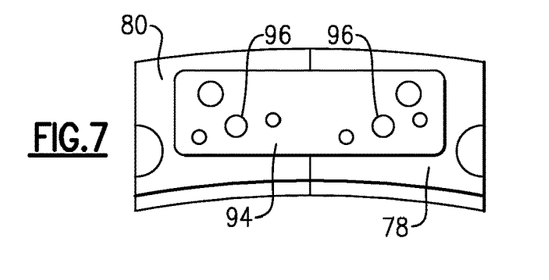
FIG. 7 is a side view of an example attachment plate.

Referring to FIGS. 5-7, the example shroud extension 56 is comprised of a first section 80 and a second section 78. The first section 80 and the second section 78 are attached together to provide a continuous annular structure. The shroud extension 56 is assembled prior to engine assembly as a full annular structure.

The first section 78 and the second section 80 are first aligned with one another by assembling an alignment pin 90 within corresponding openings 92. The alignment pin 90 may be a press fit or other fit that provides for the desired alignment between the first and second sections 78, 80 of the shroud extension 56. Once the alignment pins 90 are assembled into the two portions, attachment plates 94 are attached to each interface by way of fasteners 96 to secure together the two sections 78, 80 of the shroud extension 56.

The shroud extension 56 is provided and assembled separately from the main shroud 54 to provide radial installation of the main shroud 54 while also maintaining the desired axial gap 68 with the rotating components. Because the radially outward structure of the flow splitter 58, the main shroud 54 may not be assembled radially and still extend axially rearward to provide the desired gap 68. Accordingly, the example assembly method and structure includes the shroud extension 56 that is assembled prior to the complete assembly of the main shroud 54 that defines the desired axial gap 68 between the rotating blade 60 and the inner surface 52.

Figure 8:
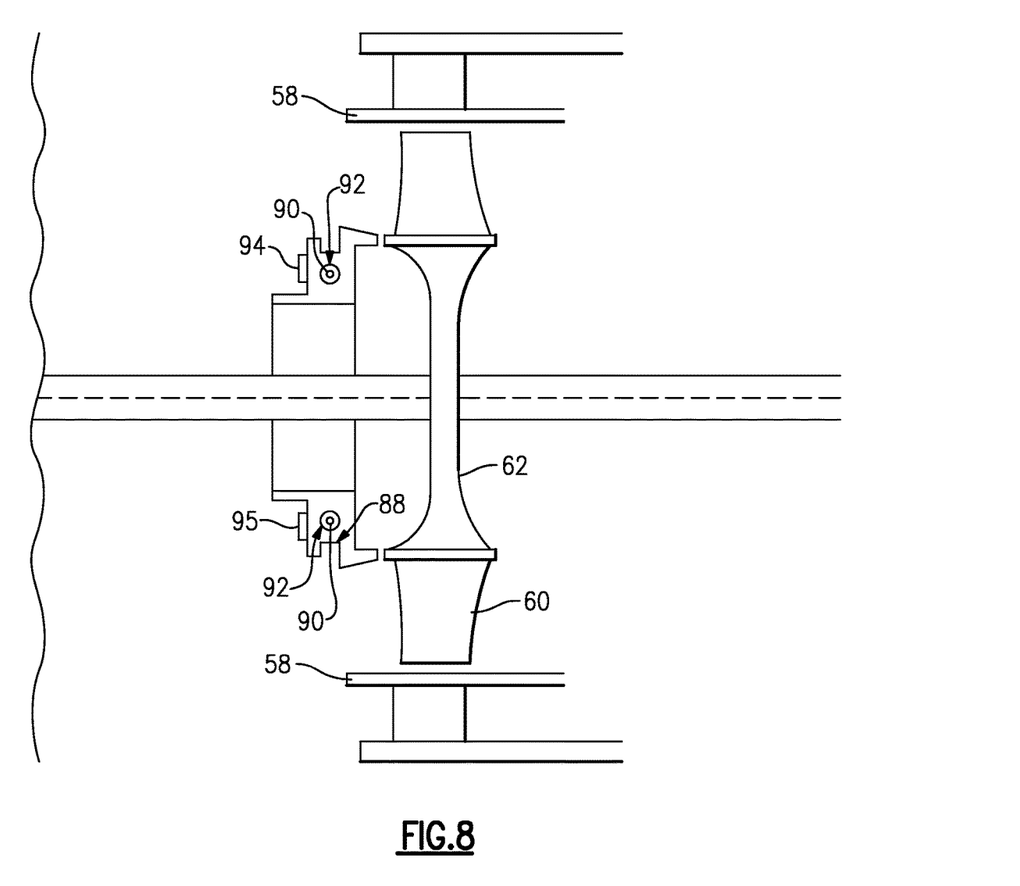
FIG. 8 is a schematic representation of an initial step of a method of assembling the example shroud extension and main shroud assemblies.

Referring to FIG. 8, an initial assembly step is schematically shown and includes positioning the shroud extension 56 relative to the rotating blade 60 and rotor 62. Because the shroud extension 56 is a relatively small feature, it can be manipulated initially supported in place relative to the rotor 62 and rotating blade 60. The shroud extension 56 is assembled normal to the engine centerline A in parts and assembled in place. The shroud extension 56 includes the first section 78 that is assembled to the second section 80. Assembly of the first section 78 to the second section includes insertion of the pin 90 into corresponding openings 92 in each of the first and second sections 78, 80 and then secured to each other with plates 94. The complete shroud extension 56 is a complete annular structure.

Figure 9:
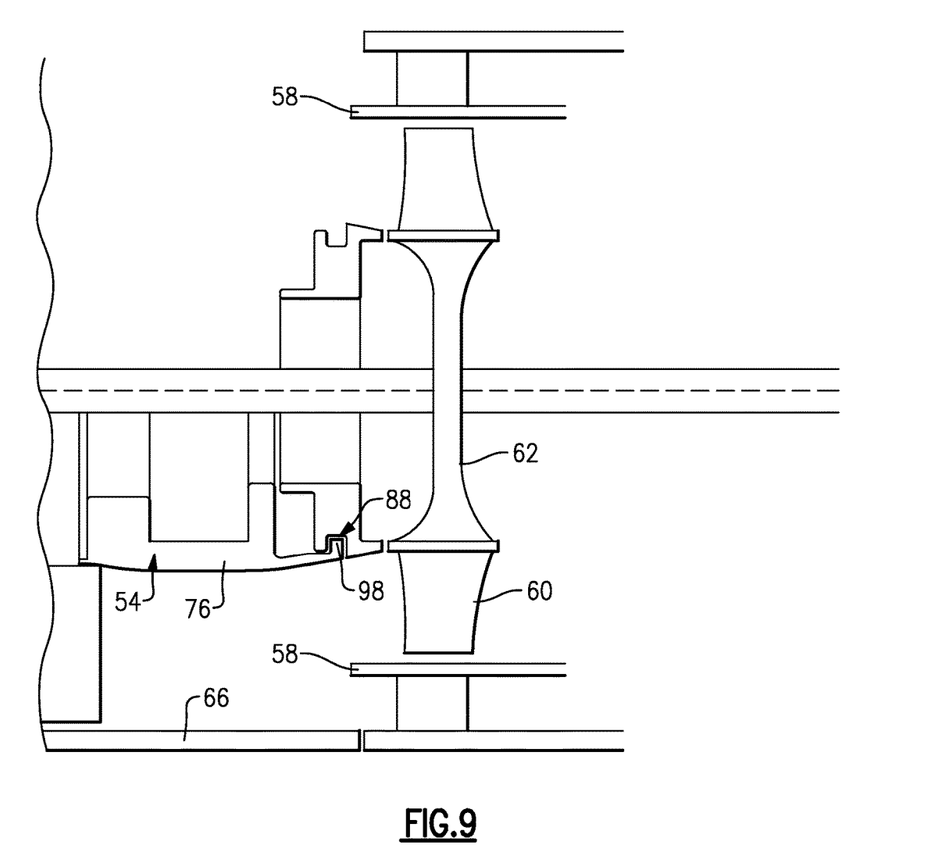
FIG. 9 is a second step in the assembly method.
Figure 11:
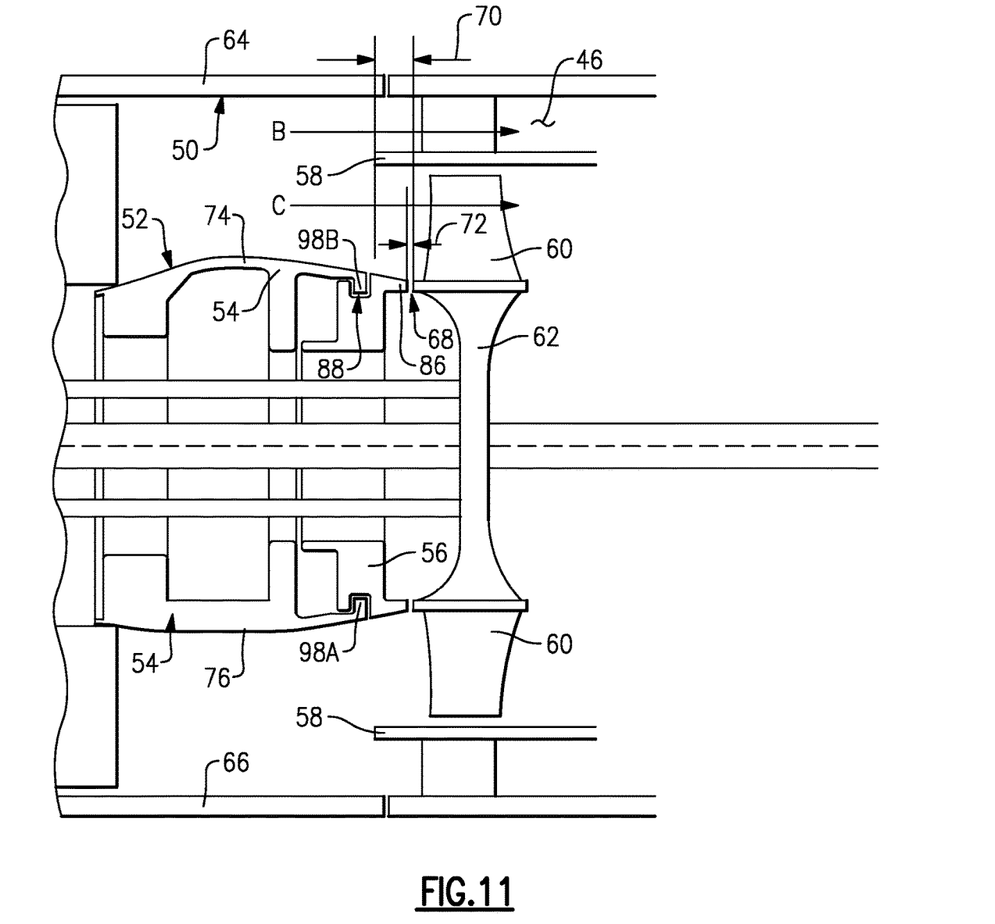
FIG. 11 is a final and completed assembly of the example turbine engine.

Referring to FIG. 9, assembly continues by mounting a first portion 76 of the main shroud 54 within a lower housing 66. In this example, the lower housing 66 is one part of a longitudinally split housing that mates with an upper housing 64 (FIG. 11). The example first portion 76 of the main shroud 54 is mounted within the lower housing 66 and assembled such that it is proximate to the rotor 62 and the blade 60. The annular tab 98 is disposed axially forward of an axially forward portion of the flow splitter 58. Accordingly, the lower housing 66 and the first portion 76 of the main shroud 54 can be assembled radially upward without interference caused by the axially extending flow splitter 58.

The first portion of the main shroud 54 includes the annular tab 98a that is received within the annular groove 88 of the shroud extension 56. Once the annular tab 98a is received within the annular groove 88; the shroud extension 56 is maintained in place by the interface provided by the annular tab 98a being received within the annular groove 88 defined about the shroud extension 56. As appreciated, because the first portion 76 of the main shroud 54 is an annular segment, it provides stability and desired positioning of the shroud extension 56 relative to the rotor 62 and the rotor 60. Shroud extension 56 is maintained in this orientation due to the interface between the first portion 76 of the main shroud 54 and the shroud extension 56.

Figure 10:
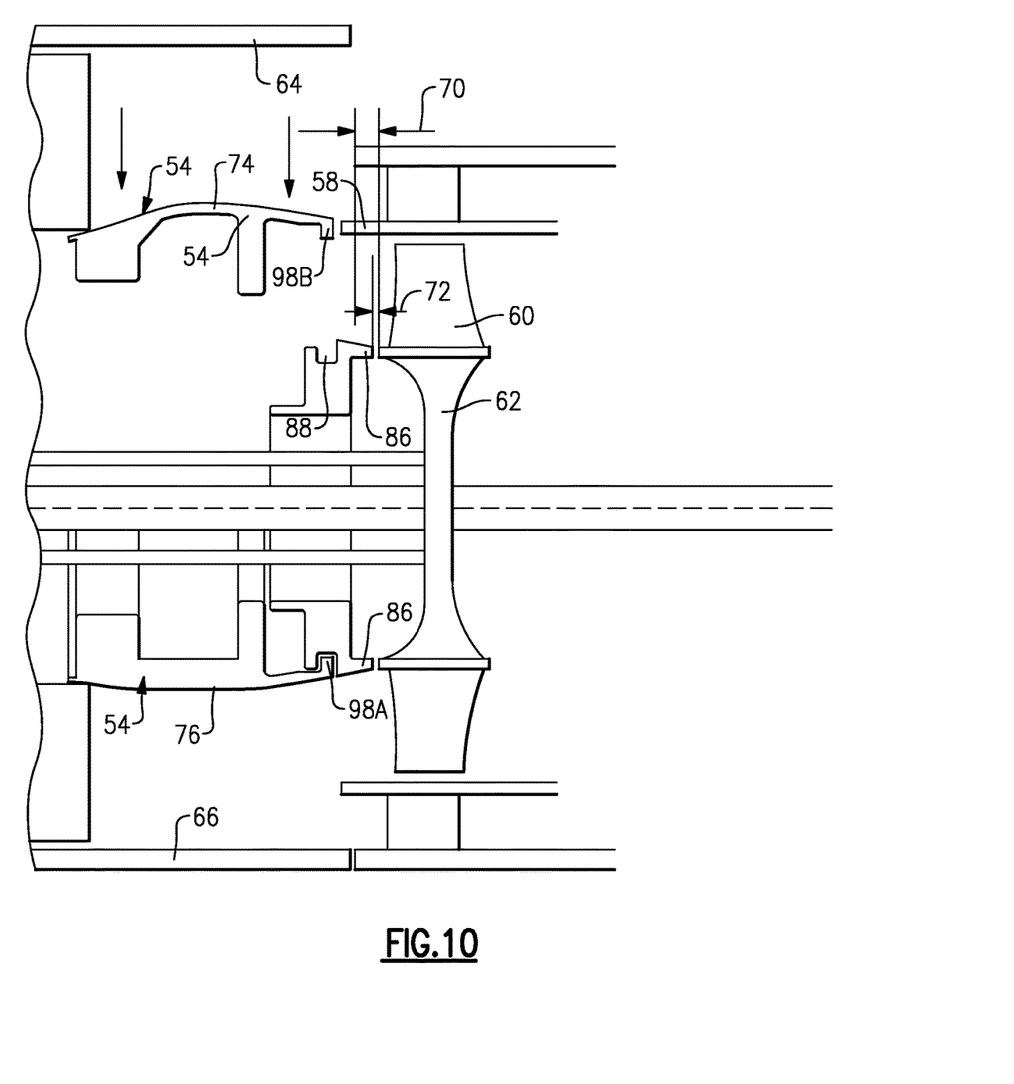
FIG. 10 is a third step of the example assembly method.

Referring to FIG. 10, a second portion 74 of the main shroud 54 is assembled to the upper housing 64. The upper housing 64 is then moved along with the second portion 74 of the main shroud 54 radially inward onto the lower housing 66 and the shroud extension 56. Because the shroud extension 56 is utilized, the second portion 74 of the main shroud 54 radially clears the flow extender 58 such that it may be installed radially inward without substantial axial movement to engage the upper tab portion 98b with the annular groove 88 defined within the flow extension 56. Accordingly, the upper housing 64 along with the second portion 74 of the main shroud 54 is assembled onto the first portion 76 of the main shroud 54 in a radial direction such that the upper tab 98b will engage and be received within the annular groove 88 defined by the shroud extension 56.

Referring to FIG. 11, a completed assembly is shown where the second portion 74 of the main shroud 54 is assembled onto the first portion 76 and the upper tab 98b is engaged to the annular groove 88 defined within the shroud extension 56.

The example shroud extension 56 includes the axial lip 86 that defines the annular gap 68 between the rotating blade 60 and rotor 62. The lip 86 is defined within the axial region 70 that overlaps the flow splitter 58. The annular groove 88 is disposed outside of that axial region 70 and does not actually overlap the flow splitter 58. Accordingly, the main shroud 54 can be assembled substantially radially without axial movement to allow for the definition of the gap 68 to be as desired.

Accordingly, the example main shroud 54 and shroud extender assembly 56 maintains the desired annular gap 68 in a region where radial assembly cannot be utilized due to radially outward and axially extending structure such as the flow splitter 58.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A method of assembling a shroud assembly for a turbine engine comprising:
   assembling a shroud extension from at least a first section and a second section about an engine axis;
   assembling a first portion of a main shroud axially into and radially inward of a first housing;
   assembling the first portion of the main shroud to the shroud extension, wherein the shroud extension extends from the first portion of the main shroud;
   assembling a second portion of the main shroud axially into and radially inward of a second housing;

radially moving the second portion of the main shroud into engagement with the first portion of the main shroud; and assembling the second housing to the first housing radially outward of the second portion of the main shroud.

2. The method as recited in claim 1, wherein the shroud extension is annular and includes an annular groove for receiving an annular tab defined on both the first main shroud and the second main shroud, and engaging the shroud extension with the second portion of the main shroud includes inserting a portion of the annular tab into the annular groove.

3. The method as recited in claim 2, wherein assembling the first portion of the main shroud to the shroud extension includes receiving a portion of the annular tab on the first main shroud within a portion of the annular groove of the shroud extension.

4. The method as recited in claim 3, wherein the annular tab extends radially inward and engages the annular groove disposed on a radially outer surface of the shroud extension.

5. The method as recited in claim 4, wherein the shroud extension includes a first axial portion including the annular groove and a second axial portion including an axially extending lip that is substantially aligned axially with the radially outer surface in a final assembly position.

6. The method as recited in claim 5, wherein the radially outer surface comprises a splitter for dividing airflow between a bypass passage and a core flow passage.

7. The method as recited in claim 1, including assembling the shroud extension from a first shroud extension part and a second shroud extension part, wherein each of the first and second shroud extension parts form a portion of an annular ring.

8. The method as recited in claim 7, including aligning the first shroud extension part with the second shroud extension part with an alignment pin received within each of the first shroud extension and the second shroud extension.

9. A turbine engine comprising:
an airflow passage including an inner surface defined by a main shroud and a shroud extension;
a flow splitter radially outward of the inner surface and axially overlapping the shroud extension;
a rotor including a blade proximate the shroud extension; and
an annular gap defined between the shroud extension and the blade of a first axial length less than a second axial length between the blade and an end of the flow splitter, wherein the shroud extension includes a groove and the main shroud includes a tab receivable within the groove.

10. The turbine engine as recited in claim 9, wherein the groove is on a radially outer surface of the shroud extension and the tab is on a radially inner surface of the main shroud.

11. The turbine engine as recited in claim 9, wherein the groove in the shroud extension is a full annular groove about a radially outer surface of the shroud extension and the tab is a full annular tab that extends radially inward from the main shroud.

12. The turbine engine as recited in claim 9, wherein the shroud extension comprises a first axial portion including the groove and a second axial portion including an axially extending lip for defining the annular gap, wherein the second axial portion is aligned with the flow splitter.

13. The turbine engine as recited in claim 9, wherein the main shroud comprises a first main shroud and a second main shroud attached to the first main shroud.

14. The turbine engine as recited in claim 13, wherein the first main shroud and the second main shroud comprise annular segments.

15. The turbine engine as recited in claim 9, wherein the shroud extension comprises an annular ring formed from a first part joined to a second part.

16. The turbine engine as recited in claim 15, including at least one alignment pin disposed between the first part and the second part for maintaining a desired alignment.

17. The turbine engine as recited in claim 16, including an attachment plate for securing the first part to the second part.

* * * * *